(12) United States Patent
Tulloch et al.

(10) Patent No.: US 12,077,287 B2
(45) Date of Patent: Sep. 3, 2024

(54) WING CONSTRUCTION

(71) Applicant: AIRBUS OPERATIONS LIMITED, Bristol (GB)

(72) Inventors: William Tulloch, Bristol (GB); Javier Ruiz De Pablo, Bristol (GB); Paul Dean, Bristol (GB); James Bird, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/162,303

(22) Filed: Jan. 31, 2023

(65) Prior Publication Data

US 2023/0242241 A1 Aug. 3, 2023

(30) Foreign Application Priority Data

Jan. 31, 2022 (GB) ...................................... 2201217

(51) Int. Cl.
*B64C 3/18* (2006.01)
*B64C 3/34* (2006.01)

(52) U.S. Cl.
CPC ................ *B64C 3/185* (2013.01); *B64C 3/34* (2013.01)

(58) Field of Classification Search
CPC ................................. B64C 3/185; B64C 3/34
See application file for complete search history.

(56) References Cited

U.S. PATENT DOCUMENTS

| | | | |
|---|---|---|---|
| 6,173,919 B1 | 1/2001 | Le Blaye | |
| 8,684,309 B2* | 4/2014 | Wildman | B64C 1/26 244/119 |
| 9,040,821 B2* | 5/2015 | Blanchard | H02G 3/0431 174/72 A |
| 11,493,081 B2* | 11/2022 | Ehring | F16C 7/06 |
| 2009/0218446 A1 | 9/2009 | McAlinden et al. | |
| 2012/0103685 A1 | 5/2012 | Blanchard et al. | |
| 2013/0001360 A1 | 1/2013 | Wildman | |
| 2013/0277372 A1* | 10/2013 | Waku | B32B 17/02 428/221 |
| 2016/0229357 A1* | 8/2016 | Renner | H02G 3/0608 |
| 2018/0155004 A1* | 6/2018 | Woolcock | B64C 3/26 |
| 2020/0207459 A1 | 7/2020 | Ehring et al. | |
| 2021/0086904 A1* | 3/2021 | Tsai | B64C 9/02 |
| 2021/0300581 A1 | 9/2021 | Peacock et al. | |

(Continued)

FOREIGN PATENT DOCUMENTS

| | | |
|---|---|---|
| EP | 0 184 931 | 6/1986 |
| EP | 0 934 877 | 8/1999 |
| EP | 2 360 801 | 8/2011 |

(Continued)

OTHER PUBLICATIONS

European Search Report cited in EP 23153389.4 mailed Jun. 2, 2023, 11 pages.

(Continued)

*Primary Examiner* — Bayan Salone
(74) *Attorney, Agent, or Firm* — Nixon & Vanderhye P.C.

(57) ABSTRACT

An aircraft wing structure (100) including a spar (101) and a systems module (200) that is releasably secured to brackets (300) on a first side of the spar (101) and the second, opposite side of the spar is configured to define a wall of a fuel tank of an aircraft wing.

12 Claims, 3 Drawing Sheets

(56) References Cited

U.S. PATENT DOCUMENTS

2022/0033058 A1\* 2/2022 Behzadpour ........... B64D 37/04

FOREIGN PATENT DOCUMENTS

| EP | 3 428 056 | 1/2019 | | |
|----|-----------|--------|---|---|
| EP | 3428056 A1 \* | 1/2019 | ............. | B64C 1/065 |
| GB | 2 587 684 | 4/2021 | | |
| GB | 2600409 | 5/2022 | | |

OTHER PUBLICATIONS

Combined Search and Examination Report for GB2201217.3, dated Jul. 22, 2022, 8 pages.

\* cited by examiner

WING CONSTRUCTION

RELATED APPLICATION

This application incorporates by reference and claims priority to United Kingdom patent application GB 2201217.3, filed Jan. 31, 2022

TECHNICAL FIELD

The present disclosure relates to the construction of aircraft wings. More particularly, but not exclusively, the invention relates to an aircraft wing structure comprising a spar and a systems module releasably secured to the spar. The invention also concerns methods of installation and removal of said systems modules.

BACKGROUND

A prior art method of wing manufacture comprises construction of the structural elements of the wing, such as the wing box, and then equipping of individual systems components to the wing structure. A disadvantage of that method is that construction of the structural elements of the wing must be completed before work can begin on the systems. Additionally, the individual placement of the systems upon the wing structure can make their removal for servicing time consuming.

Additionally, some prior art wing constructions comprise systems which are installed such that their removal requires the seal of the fuel tank to be broken. Breaking the seal of the fuel tank is complex and time consuming, and is therefore highly undesirable.

The present invention seeks to mitigate the above-mentioned problems. Alternatively or additionally, the present invention seeks to provide an improved aircraft wing structure and methods relating thereto.

SUMMARY OF THE INVENTION

The present invention provides, according to a first aspect, an aircraft wing structure comprising a spar and a systems module. A plurality of brackets is mounted upon the spar and the systems module is releasably secured to each bracket of the plurality of brackets on a first side of the spar. The second, opposite side of the spar is configured to define a wall of a fuel tank of an aircraft wing.

The aircraft wing structure according to the first aspect of the invention allows for the systems module to be separately constructed from and in parallel with the spar and other structural elements of the wing structure, and then installed in a relatively simple installation procedure by releasably securing the systems module to the brackets. The modular wing construction of the invention thereby simplifies and speeds up the process of wing manufacture when compared to prior art methods which require the structural and systems elements of the aircraft wing to be constructed in series. This arrangement is of course also advantageous from a service and maintenance perspective, because it allows for the systems module to be easily removed from the spar structure in the event that it needs to be serviced or replaced.

The aircraft wing structure of the first aspect of the invention is also configured to form part of an aircraft wing which is arranged such that the systems module can be conveniently installed or removed from the aircraft wing without having to break the fuel tank seal. This is achieved by releasably securing the systems module to the brackets situated on the spar such that the brackets themselves do not need to be removed in order to remove the systems module from the aircraft wing.

The brackets may be spaced apart in a spanwise direction along the spar. The plurality of brackets may comprise two, three, or four brackets. However, it is within the scope of the invention for the plurality of brackets to comprise more than four brackets. The spar may be a front or rear spar of the aircraft wing structure. One or more of the brackets may be mounted directly upon the spar. Alternatively, one or more of the brackets may be indirectly mounted upon the spar via an intermediate structure.

The systems module may in principle comprise any aircraft system, but preferably the systems module comprises aircraft systems for which easy removal is advantageous. For example, the systems module may comprise electronic or hydraulic systems, or bleed air. In some embodiments the systems module may comprise line replacement items which must be replaced at key service intervals.

One or more of the brackets of the plurality of brackets may be fastened to the spar by a fastener. A bolt of the fastener may pass through the spar such that, when the aircraft wing structure forms part of an aircraft wing, an end of the fastener is situated within the fuel tank of the aircraft wing. For example, the bracket may be mounted directly to a front or rear spar which defines a wall of a fuel tank of the aircraft wing structure so that, by penetrating the spar, the fastener penetrates the fuel tank. However, because the systems module is releasably secured to the brackets of the aircraft wing structure, there is no need to remove the brackets from the spar in the event that it becomes necessary to dismount the systems module from the spar. Accordingly, the inside of the fuel tank does not need to be accessed in order to remove the systems module from the spar and the bracket can be effectively left permanently mounted to the structure of the aircraft wing, should that be desirable.

Alternatively or additionally, one or more of the brackets may be bonded to the spar. A bracket may be bonded directly to the first side of the spar. The brackets may be adhesively bonded to the aircraft structure using a co-bonding process or a co-curing process. Bonding the bracket to the spar removes the need for holes to be provided in the spar, so this may provide an advantageous means of mounting the bracket to the spar when holes in the spar are undesirable. For example, it is generally undesirable to provide holes in an aircraft fuel tank so, where the housing is to be mounted to a structure of the aircraft wing at a location that would necessitate fastener holes to be provided in the fuel tank, it may be desirable to bond the bracket to the structure in order to avoid having to provide such holes.

One or more of the brackets of the plurality of brackets may comprise a main body and an intermediate member. The systems module may be releasably secured to the intermediate member and the intermediate member may be releasably secured to the main body which may be, for example, a base portion of the bracket. For example, a separate intermediate member may be secured to each bracket and the systems module may be secured to each intermediate member. Alternatively a single intermediate member may be secured to two or more of the brackets of the plurality of brackets. It will be understood by the skilled person that the variety of structures could serve as an appropriate intermediate member.

Use of an intermediate member may be advantageous where the brackets are effectively permanently installed on the spar, and their removal is difficult or undesirable. For example, if the brackets are bonded to the spar or where removing the brackets may necessitate breaking the fuel tank seal. In these cases, care must be taken to minimise wear or damage to the brackets in order to prolong their lifespan and thereby increase the amount of time the brackets can remain mounted to the spar without removal. Wear or damage to the brackets can be caused by removal or installation of the electronics systems module so, by securing the electronics systems module to an intermediate member, that wear or damage can be instead caused to the intermediate member which can easily be replaced with a new intermediate member should the intermediate member be excessively worn or damaged.

One of the brackets may comprise a substantially U-shaped portion. The substantially U-shaped portion may form a main body of the bracket. The brackets may comprise a base portion which is mounted upon the spar. The base portion may be in the form of a base plate. The base portion may be adhesively bonded to the spar, or to a structure adjacent the spar. Alternatively or additionally, one or more fasteners may pass through the base portion and through the spar, or a structure adjacent the spar, to fasten the base portion to the spar. Two arm portions of the bracket may extend away from the base portion. The arm portions may be oriented substantially perpendicularly to the base portion. Where the base portion is fastened to the spar using fasteners, the systems module may be fastened to the arms of the base portion using fasteners which are oriented substantially parallel to the arms of the base portion. For example, the fasteners may enter the distal ends of the arms of the base portion. Where the brackets comprise an intermediate member, the intermediate member may be releasably secured between the arms of the base portion. The intermediate member may be releasably secured to the base portion by one or more fasteners which pass through the arms of the base portion and through the intermediate member, said fasteners may be oriented substantially perpendicularly to the direction in which the arms extend.

The systems module may comprise a plurality of mounting members. Each mounting member of the plurality of mounting members may be releasably secured to a respective one of the brackets of the plurality of brackets. Each mounting member may comprise a raceway module comprising a plate carrying a plurality of electrical cables. The plate may be releasably secured to one or more of the brackets of the plurality of brackets.

The systems module may be releasably secured to each bracket of the plurality of brackets by a fastener comprising a barrel nut. The barrel nut may be configured to engage with a part of the bracket to prevent rotation of the barrel nut when rotating the bolt within the barrel nut to tighten or untighten the fastener. The fastener may pass through one or more mounting members of the systems module.

According to a second aspect, the present invention provides an aircraft wing comprising the aircraft wing structure of the first aspect of the invention. The spar of the aircraft wing structure defines a wall of a fuel tank of the aircraft wing.

According to a third aspect, the present invention provides an aircraft comprising the wing of the second aspect of the invention.

According to a fourth aspect, the present invention provides a kit of parts suitable for forming an aircraft wing structure. The kit comprises a spar and a systems module, wherein a plurality of brackets is mounted upon the spar, and wherein the systems module is configured to be releasably secured to each bracket of the plurality of brackets on a first side of the spar. The second, opposite side of the spar is configured to define a wall of a fuel tank of an aircraft wing.

According to a fifth aspect, the present invention provides a method of removing a systems module from an aircraft wing structure. The aircraft wing structure comprises a plurality of brackets mounted upon a spar of the aircraft wing structure, the brackets being positioned on a first side of the spar and the second, opposite side of the spar is configured to define a wall of a fuel tank of an aircraft wing. The systems module is releasably secured to each bracket of the plurality of brackets. The method comprises the step of unsecuring the systems module from each of the brackets and moving the systems module away from the aircraft wing structure. The aircraft wing structure may form part of an aircraft wing. The wing may form part of an aircraft. Alternatively, the method may be performed on a wing structure which does not form part of an aircraft. For example, where the wing structure or wing has been removed from or has not yet been installed on an aircraft.

According to a sixth aspect, the present invention provides a method of installing a systems module upon a spar of an aircraft wing structure. The aircraft wing structure comprises a plurality of brackets mounted upon a spar of the aircraft wing structure, the brackets being positioned on a first side of the spar and the second, opposite side of the spar is configured to define a wall of a fuel tank of an aircraft wing. The method comprises releasably securing the systems module to each bracket of the plurality of brackets. The wing may form part of an aircraft. Alternatively, the method may be performed on a wing structure which does not form part of an aircraft. For example, where the wing structure or wing has been removed from or has not yet been installed on an aircraft.

It will of course be appreciated that features described in relation to one aspect of the present invention may be incorporated into other aspects of the present invention. For example, the methods of the fifth or sixth aspects of the invention may incorporate any of the features described with reference to the wing structure of the first aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
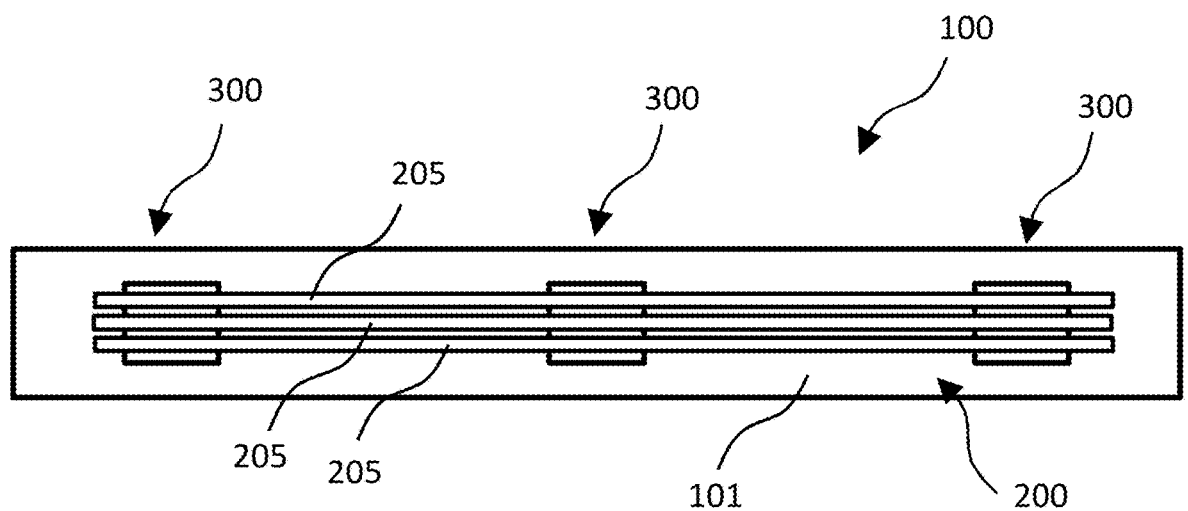
FIG. 1 is a schematic drawing an aircraft wing structure according to a first embodiment of the invention comprising a systems module removably mounted to a wing spar.
Figure 2:
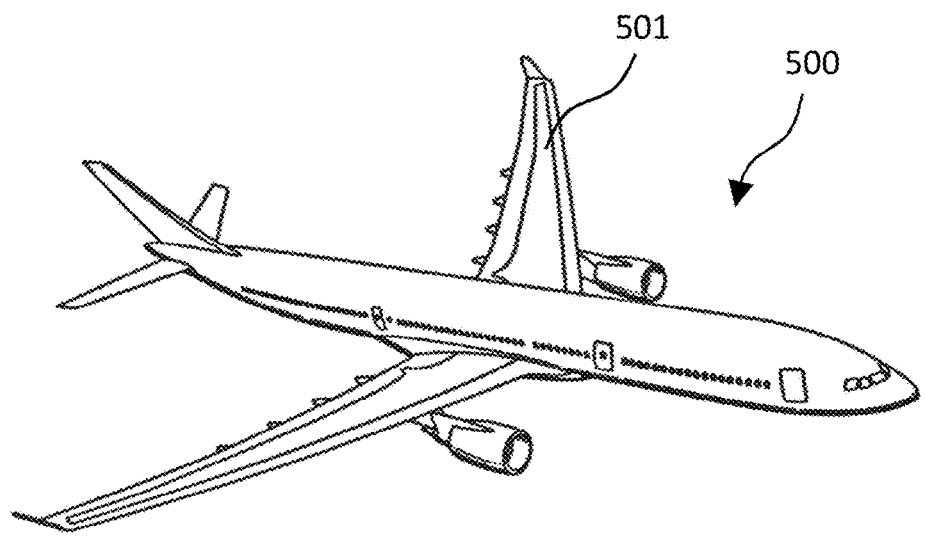
FIG. 2 shows an aircraft having a wing comprising the aircraft wing structure shown in FIG. 1.

An aircraft wing structure 100 according to a first embodiment of the invention are shown in FIG. 1. The aircraft wing structure 100 is configured to form part of a wing 501 of the aircraft 500 shown in FIG. 2, and comprises a rear spar 101 and a systems module 200. The rear spar is configured to form part of the wing box of the aircraft wing 501. Other embodiments of the invention may alternatively or additionally comprise a front spar. In some embodiments of the invention the aircraft wing structure may form part of the aircraft wing, while in other embodiments the aircraft wing structure may not yet form part of the construction of a completed aircraft wing.

The systems module 200 comprises various electronic systems and associated cable raceways which have been integrated into a single module 200 that can be constructed separately from the spar 101, and which is configured to be installed in a relatively simple installation process, as will be described in more detail below. While the systems module 200 comprises electronic systems, in other embodiments the systems module may alternatively or additionally comprise hydraulic systems or bleed air. In some embodiments the systems module may include line replacement items, which must be replaced at key service intervals.

Figure 3:
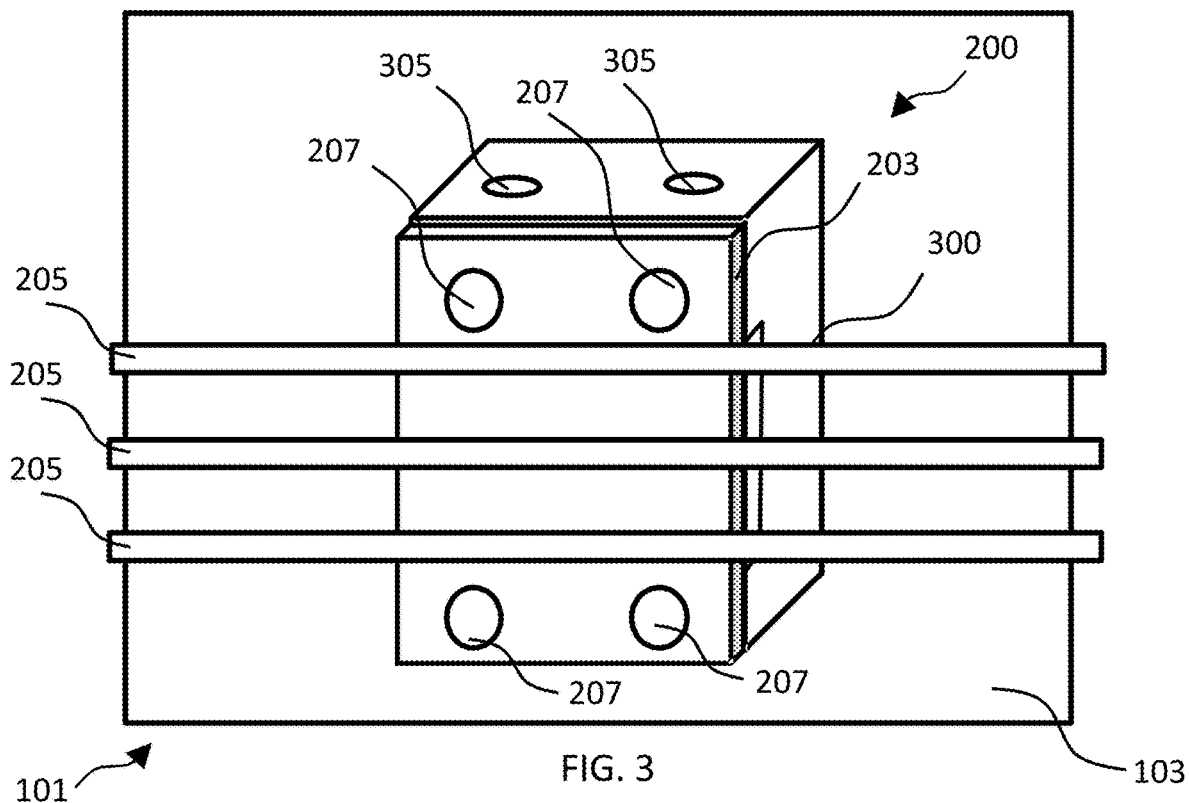
FIG. 3 is a schematic drawing of a bracket of the aircraft wing structure of FIG. 1.

The systems module 200 is releasably secured to the spar 101 via a plurality of brackets 300 which are spaced apart along the spar 101 in a span-wise direction, as shown in FIG. 1. One of the brackets 300 is shown in isolation in FIG. 3. The bracket 300 is formed by a body having a generally U-shaped cross-section formed by two extending arms 301 connected by a base 303 which extends between the arms 301, as can be best seen in the cross-sectional view of FIG. 4. The bracket 300 is bolted to a first side 103 of the spar 101 by fasteners 107 which extend through the base 303 of the bracket 300 and through the spar 101. As can also been seen in FIG. 4, the second, opposite side 105 of the spar 101 forms a wall of a fuel tank 109 of the aircraft wing structure 100 such that the fasteners 107 penetrate the fuel tank 109.

Figure 4:
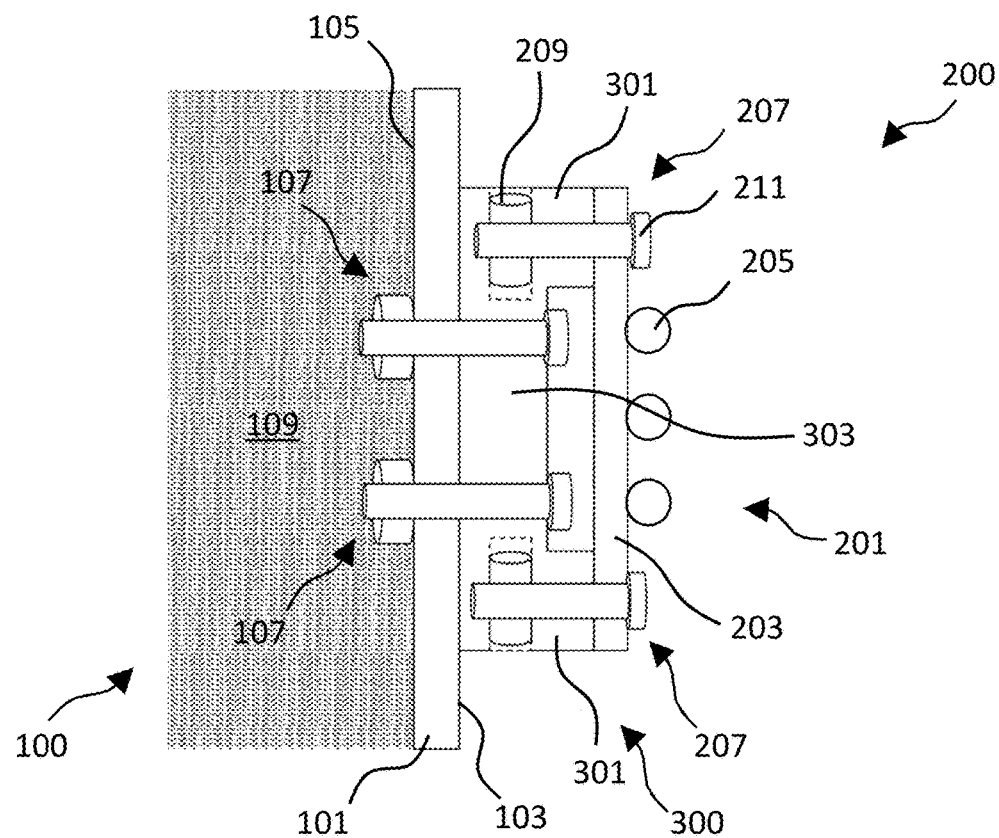
FIG. 4 is a schematic cross-sectional view of the bracket shown in FIG. 3.

In the presently described embodiment of the invention, the systems module 200 is secured to the each of the brackets 300 via a raceway plate 201 comprising a plate portion 203 that carries a plurality of electrical cables 205. The plate portion 203 is formed with a plurality of holes so that the plate portion 203 can be bolted to the bracket 300 using fasteners 207. As can be seen in FIG. 4, the raceway plate 201 is placed onto the distal ends of the arms 301 of the bracket 300 so that the raceway plate is oriented substantially parallel with the base 303. The bolts 211 of the fasteners pass through the holes in the raceway plates and into corresponding holes formed in the distal ends of the arms of the bracket 301. Each of the bolts 211 engage with a barrel nut 209 which is situated within an opening 305 formed in a side of the bracket 300. The size of each of the openings 305 is such that barrel nuts 209 cannot rotate within the openings 305 when the bolt 211 of the fastener 207 is screwed into or out of the barrel nut 209. Accordingly, when fastening and unfastening each of the fasteners 207, there is no need to access the barrel nut 209 with a tool. The use of fasteners 207 comprising barrel nuts 209 is therefore advantageous because it simplifies fastening and unfastening of the fasteners 207, and removes the design constraint of being needing to be able to access the nut of the fastener with a tool.

In other embodiments of the invention, fasteners comprising conventional nuts, or other methods of releasably securing the systems module to the aircraft structure may of course be used. Additionally, other embodiments of the invention may use alternative mountable members of the systems module instead of raceway plates. For example, a mountable member of the systems module may be configured to clip into the bracket, or vice versa, or the systems module may be retained in position upon the bracket by pins or a clasp arrangement.

The embodiment of the invention described above facilitates modular wing construction, whereby the spar 101 and the systems module 200 can be constructed in parallel, following which the systems module 200 can be installed upon the brackets 300 in a relatively quick and straightforward manner. This potentially enables a reduction in the time taken to manufacture a wing when compared to prior art methods where the spar is constructed and then each of the electronic systems are separately installed upon the wing structure. Additionally, because the systems module 200 is releasably secured to the bracket 300, when it becomes necessary to remove the systems module 200 from the aircraft wing, for example during servicing or for replacement, there is no need to break the seal of the fuel tank because there is no need to remove the spar fasteners. The bracket 300 can effectively be left permanently mounted to the spar 101.

Figure 5:
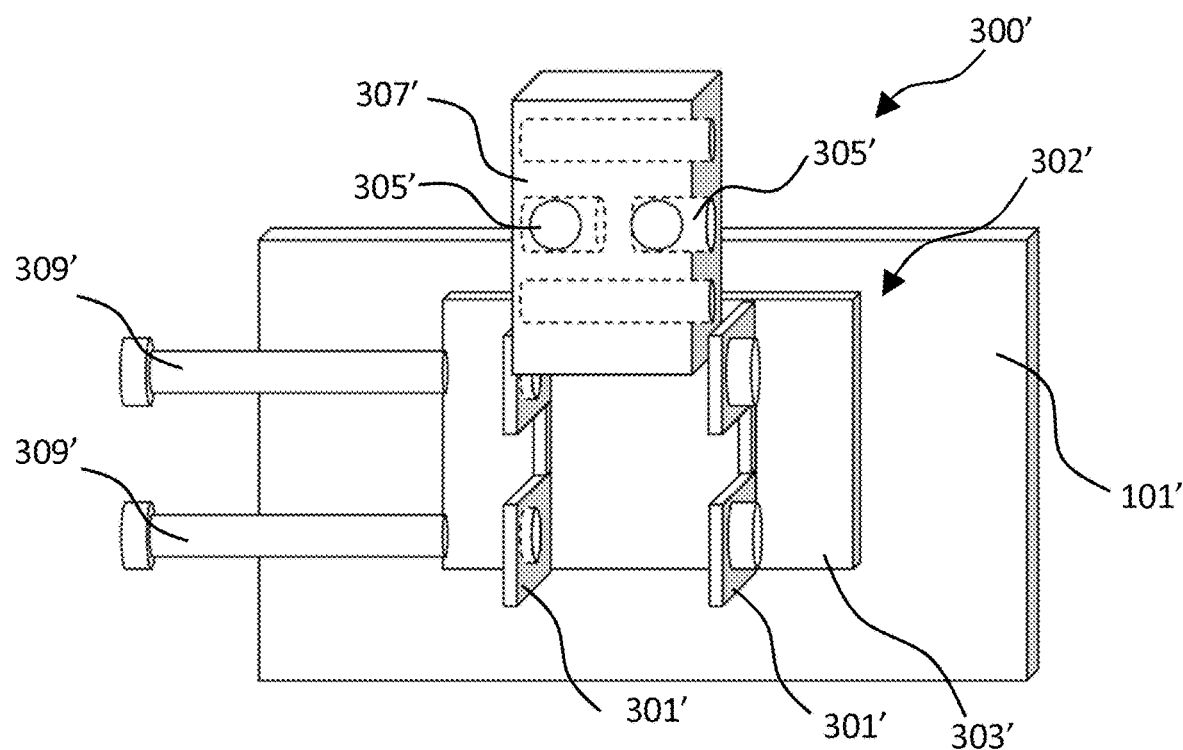
FIG. 5 is a schematic drawing of a bracket configured for removably mounting a systems module to a spar in an aircraft wing structure according to a second embodiment of the invention, the bracket is shown with its mounting block removed from its base plate.
Figure 6:
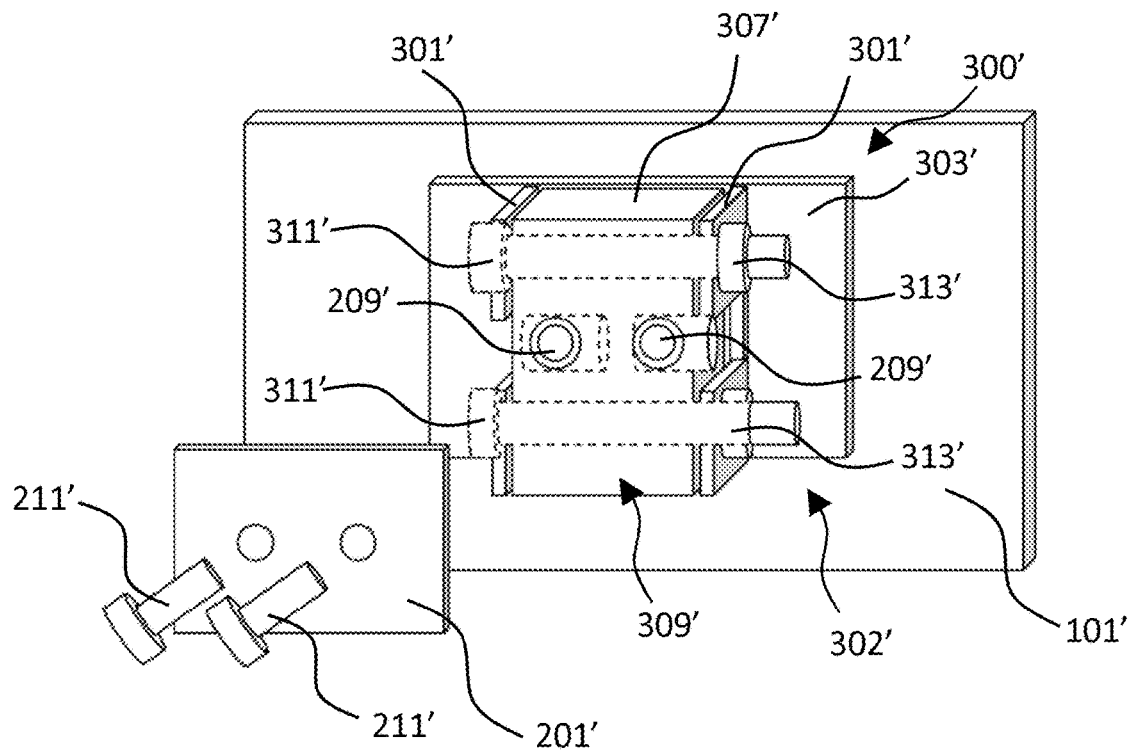
FIG. 6 is another schematic drawing of the bracket of FIG. 5, the bracket is shown with the mounting block in a position ready to be secured to its base plate.

In an aircraft wing structure according to a second embodiment of the invention the brackets 300' are adhesively bonded to the spar 101', as shown in FIG. 5 and FIG. 6. Adhesively bonding the brackets 300' to the spar 101', as opposed to mechanically fastening the brackets using fasteners, provides an advantage of avoiding having to provide holes in the spar 101'.

The brackets 300' comprise a base portion 302' comprising a base plate 303' which is co-bonded to the spar 101', and two parallel arms 301' which are spaced apart and extend perpendicularly from the base plate 303', away from the spar 101'. The brackets 300' further comprise a generally cuboidal mounting block 307' which is removably mounted between the arms 301' of the base portion via fasteners 309' which pass through each of the arms 301' and through the mounting block 307'.

The systems module 200' of the second embodiment of the invention is releasably secured to the each of the mounting blocks 307' via a plate 201' of the systems module 200'. The plate 201' is formed with a plurality of holes so that the plate 201' can be bolted to the bracket 300' using fasteners 207'. As can be seen in FIG. 6, the plate 201' is placed onto the mounting block 307' of the bracket 300' and is removably mounted to the mounting block 307' using fasteners 207'. The bolts 211' of the fasteners 207' pass through the holes in the plate 201' and into corresponding holes formed in the mounting block 307'. Each of the bolts 211' engage with a barrel nut 209' which is situated within an opening 305' formed in a side of the mounting block 307'. The size of each of the openings 305' is such that barrel nuts 209' cannot rotate within the openings 305' when the bolt 211' of the fastener 207' is screwed into or out of the barrel nut 209'. Accordingly, when fastening and unfastening each of the fasteners 207', there is no need to access the barrel nut 209' with a tool. In other embodiments of the invention other methods of releasably secured the systems module to the aircraft structure may of course be used. For example, a mountable member of the systems module may be configured to clip into the mounting block, or vice versa, or the systems module may be retained in position upon the mounting block by pins or a clasp arrangement.

The bracket 300' arrangement of the second embodiment of the invention therefore provides an advantageous way of mounting a systems module to the spar 101' of the aircraft wing where is it undesirable to use fasteners. For example, the use of the bracket 300' can avoid the use of fasteners which penetrate a fuel tank. The base portion 302' of the bracket 300' can be left permanently mounted to the spar 101 because the systems module 200' is releasably secured to the base portion 302' via the mounting block 307', which serves as an intermediate member between the systems module 200' and the base portion 302'. The systems module 200' can be removed from the aircraft wing by either unfastening the plate 201' from the mounting block 307' or by unfastening the mounting block 307' from the base portion 302'. However, because the base portion 302' of the bracket 300' is bonded to the spar, and therefore not easily removable, it may be preferable to reduce wear and tear of the base portion 302 and leave the mounting block 307' semi-permanently mounted to the base portion 302'. The mounting block 307' can then be replaced in the event that it becomes damaged or overly worn from repeated fastening and unfastening of the systems module 200' from the mounting block 307'.

Whilst the present invention has been described and illustrated with reference to particular embodiments, it will be appreciated by those of ordinary skill in the art that the invention lends itself to many different variations not specifically illustrated herein. For example, it should be understood that an aspect of the invention is that it provides, in its broadest sense, a wing structure wherein a systems module is removably mounted to a spar via plurality of brackets. This aspect of the invention is not itself limited to the types of bracket described above in relation to the first and second embodiments of the invention. The skilled person will be aware of other types of bracket which are suitable for use in removably mounting a systems module. Additionally, it should be noted that a bracket of the type described with respect to the first embodiment of the invention could be bonded to the spar and that a bracket of the type described with respect to the second embodiment of the invention could be mechanically fastened to the spar.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. The word "or" means and/or unless clearly indicated otherwise. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing structure comprising:
a spar having a first side and a second side opposite the first side, a plurality of brackets, and
a systems module,
wherein each of the brackets includes a pair of arms connected by a base,
wherein the arms are spaced apart by the base and extend away from the base substantially parallel to each other,
wherein each of the brackets is mounted to the first side of the spar and the pair of arms extend away from the first side;
wherein the second side of the spar is configured to define a wall of a fuel tank of an aircraft wing;
wherein the system module includes a plate carrying a plurality of electrical cables, and
wherein the plate is releasably secured to arms of each of the brackets by bolts which extend through the plate and engage holes in the arms of the brackets,
wherein each of the bolts passes into a hole in one of the arms and the hole has an open end in a distal end of the arm and extends through the arm from the distal end towards the base of the bracket;
wherein each of the bolts engages with a respective barrel nut positioned within a respective channel in the bracket, and
wherein each of the channels is sized to receive the barrel nut such that rotation of the barrel nut about the bolt is prevented by the channel.

2. The aircraft wing structure of claim 1, wherein one or more of the brackets is fastened to the spar by a fastener configured such that, when the aircraft wing structure forms part of the aircraft wing, an end of the fastener is situated within the fuel tank of the aircraft wing.

3. The aircraft wing structure of claim 1, wherein at least one of the brackets is adhesively bonded to the spar.

4. The aircraft wing structure of claim 1, wherein at least one of the brackets comprises an intermediate member, and
wherein the plate is releasably secured to the intermediate member and the intermediate member is releasably secured to the arms of each bracket, and
the plate is parallel to the base.

5. An aircraft comprising the aircraft wing structure according to claim 1.

6. The aircraft wing structure of claim 1, wherein, for each of the brackets, the plate is spaced apart from the base and bridges a space between the arms of the bracket.

7. The aircraft wing structure of claim 6, wherein, for each of the brackets, the plate is oriented parallel with the base of the bracket.

8. An aircraft wing comprising:
a spar having a first side and a second side opposite the first side,
an internal fuel tank having a wall formed by the second side of the spar,
brackets mounted to the first side of the spar, wherein each of the brackets includes a base mounted to the first side of the spar and a pair of arms extending from the base and away from the first side of the spar, wherein the arms are separated along a direction parallel to the base and the arms each include a hole extending from a distal end of each arm towards the base and to a respective channel in the bracket;
a plate of the system module supporting electrical cables extending parallel to the spar;
bolts each extending through the plate and a respective one of the holes in the arms;
barrel nuts in the bracket, wherein each of the barrel nuts is within a respective one of the channels and receives a respective one of the bolts,
wherein each channel has a size to prevent the barrel nut in the channel from rotating about the bolt extending into the channel.

9. The aircraft wing of claim 8, wherein the holes in the arms are parallel to the arms.

10. The aircraft wing of claim 9, wherein the electrical cables are mounted to a first side of the plate and a second side of the plate, opposite the first side, abuts the distal ends of the arms.

11. The aircraft wing of claim 8, wherein the plate of the system module is separated from the bases of the brackets by gaps between each of bases and the plate.

12. The aircraft wing of claim 8, wherein the plate is planar and extends substantially parallel to the spar.

* * * * *